United States Patent Office 2,822,911
Patented Feb. 11, 1958

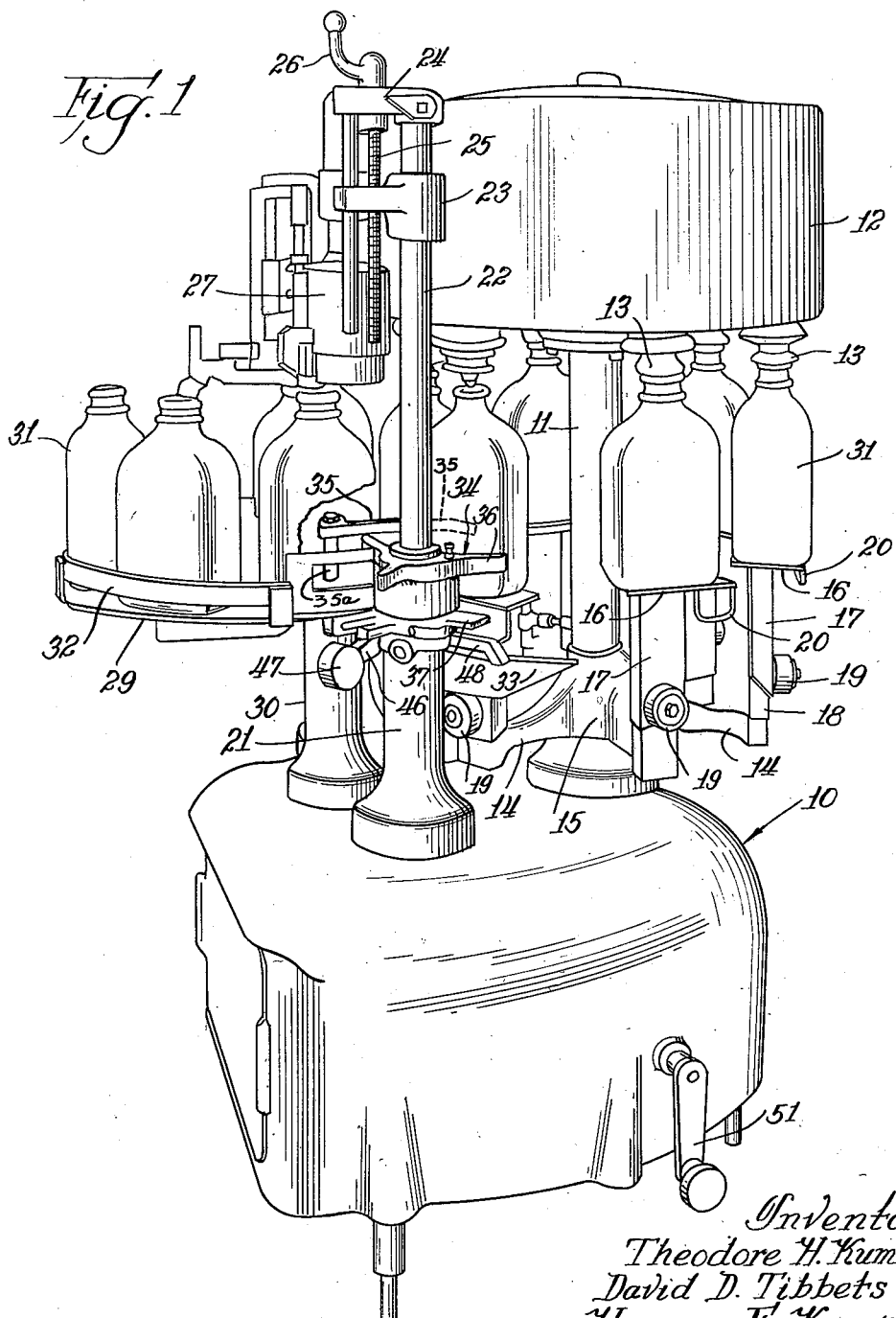

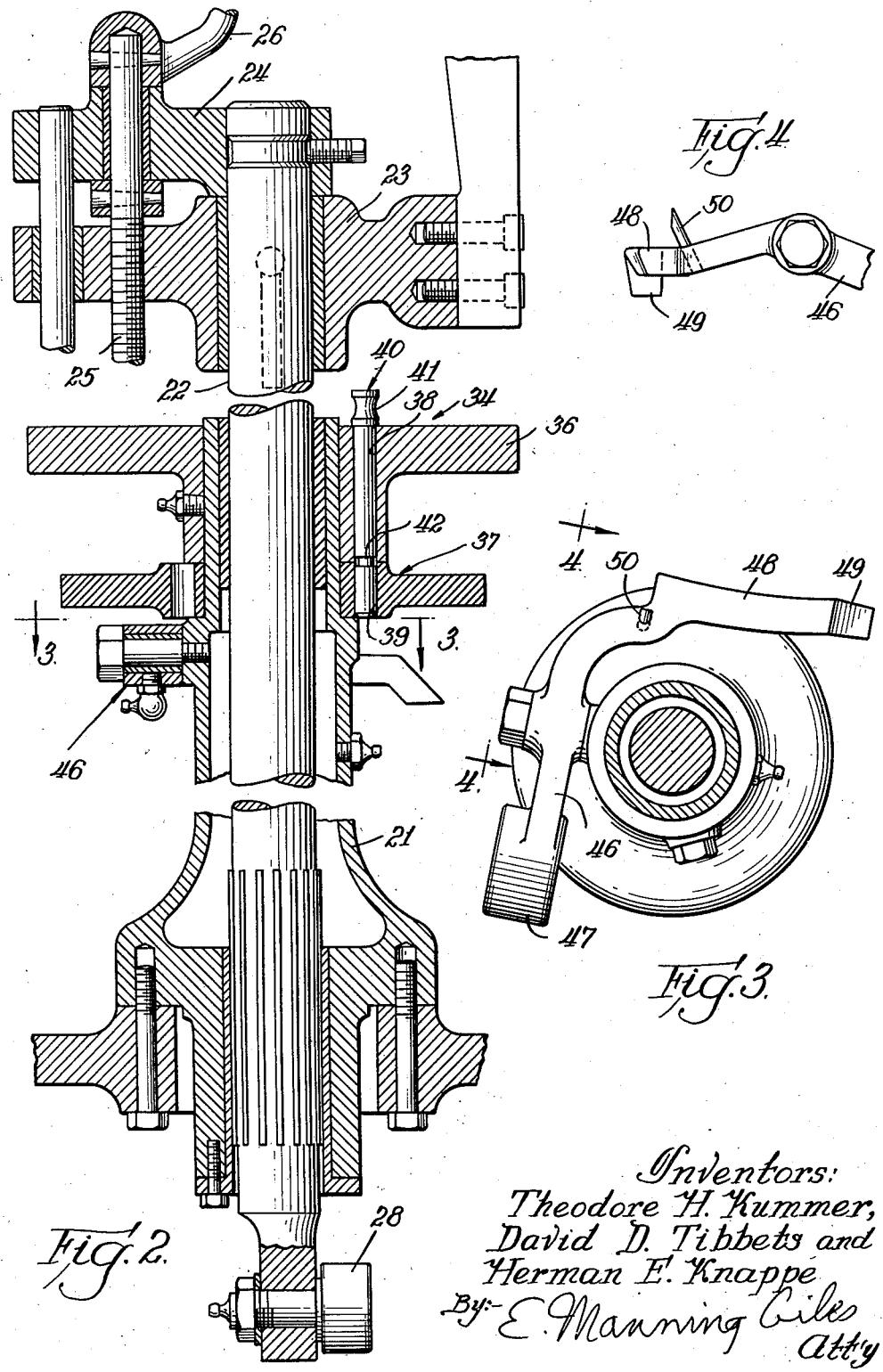

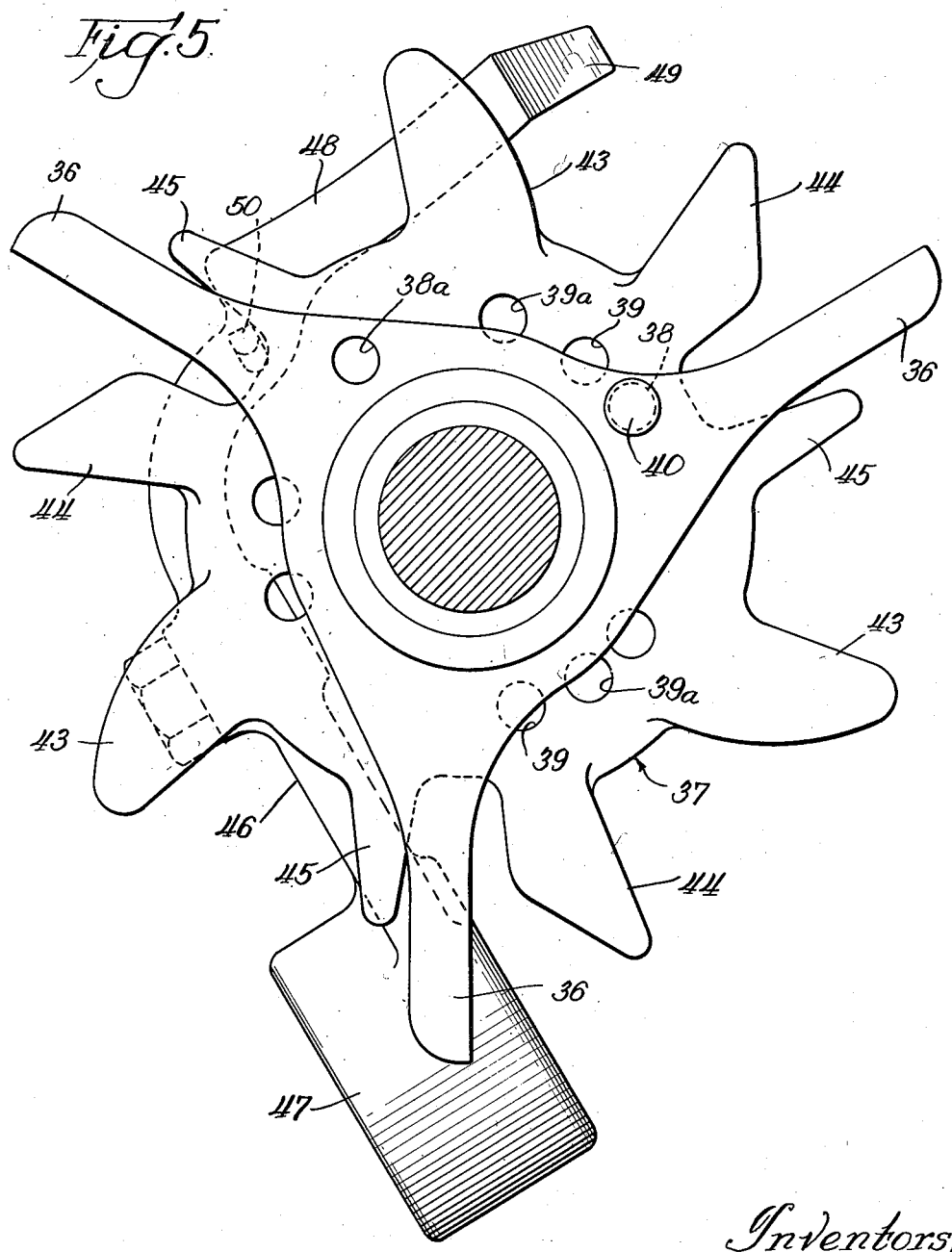

2,822,911

ADJUSTABLE BOTTLE TRANSFER MEANS

Theodore H. Kummer and David D. Tibbets, Waukesha, and Herman E. Knappe, Milwaukee, Wis., assignors to Cherry-Burrell Corporation, Chicago, Ill., a corporation of Delaware Application April 12, 1954, Serial No. 422,566

2 Claims. (Cl. 198—25)

Our invention relates to an adjustable transfer device for milk bottles and the like and has reference more particularly to means for the coordinated intermittent transfer of such bottles from successive moving bottle supports or lifters to a stationary bottle-capper platform.

The bottling and capping of milk bottles are usually consolidated in a single piece of equipment. The bottles are then delivered either by hand or on a conveyor to the bottle filler which performs its function and then delivers each bottle to a predetermined position under the capper where the capping operation is performed. From there, the bottles are removed by hand or on a conveyor.

Because of the various sizes and shapes of milk bottles used in the average dairy, it is desirable to have a filler and capper which is readily adaptable to handle anything from a squat half-pint bottle to a square or rectangular 2-quart size or even to the gallon jug size.

It is the principal object of our invention to design adjustable transfer means for removing bottles from moving supports and delivering them to a stationary platform and to enable quick and convenient adjustment of such means to handle virtually any commonly used size of milk bottle or the like.

It is another object of our invention to provide such transfer means which may be conveniently disassembled, cleaned, and reassembled in accordance with highest sanitary standards.

And it is a further object of our invention to insure positive, trouble-free operation of such adjustable transfer means and to avoid accidental displacement of such means during pauses between transfer movement of the bottles, these and other objects being accomplished as hereinafter described, reference being had to the accompanying drawing in which Fig. 1 is a perspective view of a bottle filler and capper provided with adjustable bottle transfer means embodying our invention;

Fig. 2 is a sectional view of the capper shaft and support of the filler and capper shown in Fig. 1;

Fig. 3 is a sectional view on the line 3—3 of Fig. 2;

Fig. 4 is a view taken on the line 4—4 of Fig. 3; and

Fig. 5 is a plan view of the starwheel portion of said transfer means and the cooperating cam therebelow.

Referring now to the drawing and particularly to Fig. 1, the transfer means to be described herein is shown as applied to a milk bottle filler the base of which is designated generally by the reference numeral 10. The base 10 is provided with a vertical column 11, the lower end of which projects into the base 10 where it is driven by a motor (not shown) housed in the base 10 to cause the column 11 to rotate. A circular tank or bowl 12 is mounted on top of the column 11 and rotates therewith.

The bowl 12, which is preferably of stainless steel, serves as a reservoir for milk or other such fluid and the bowl 12 is provided peripherally around the bottom with filling valves 13 spaced equidistant apart.

The base 10 is provided with radial brackets 14 mounted on a collar 15 which rotates with the column 11, the brackets 14 being spaced to correspond with the filling valves 13. Each bracket 14 has a platform-like bottle support or lifter 16 mounted thereon, and each bottle lifter 16 has a downwardly depending socket 17 telescopically mounted in spring loaded relation on a corresponding upstanding member 18 on the bracket 14. Each socket 17 has a roller 19 mounted on the side remote from the column 11, and each bottle lifter 16 is provided with a downwardly depending U-shaped yoke 20 along the outer edge thereof remote from the column 11.

A vertical housing 21 is mounted on the base 10 and spaced sufficiently from the column 11 to permit free movement of the bottle lifter 16 therepast when the column 11 is rotated. A shaft 22 is disposed vertically within said housing 21.

A capper support 23 is slidably mounted on the shaft 22 to permit adjustment with respect to a top member 24 secured to the top of the shaft 22. A threaded rod 25 journaled in the top member 24 is threadably engaged in the capper support 23 and may be rotated by means of a crank 26 to position the capper support 23.

A capping head 27 secured to the capper support 23 is adapted to receive a quantity of caps in a tubular magazine (not shown) and must be positioned at a predetermined level above the bottles to be capped, the level being determined by the height of the particular bottles being handled at any one time. The shaft 22 is activated by a motor driven double circumferential cam (not shown) mounted in the base 10, the shaft 22 being provided at its lower end with a roller 28 interposed between the respective parts of the double cam so as to raise and lower the shaft 22 at selected intervals as the cam rotates.

A platform 29 is supported on a post 30 mounted on the base 10, the platform 29 serving to support bottles 31 as they are delivered to the filler either by hand or by conveyor. Likewise, as the bottles 31 complete the filling operation they are removed from the successive bottle lifters 16 where they are transferred to the platform 29 and at that point each in turn is capped by the capping head 27. A bar 32 is provided along the edge of the platform 29 to guide the bottles 31 as they are discharged from the capper and moved along the platform 29.

The vertical housing 21 and the post 30 have an arcuate cam member 33 adapted to be engaged by the rollers 19 on the bottle lifters 16 as the said bottle lifters 16 move circumferentially around their axis, the column 11, when the filler is in operation substantially as disclosed in Lippold Patent No. 2,642,214 granted June 16, 1953. The leading edge of the downwardly facing cam member 33 slopes downwardly so that as each roller 19 comes into engagement therewith and continues therealong, it is drawn downwardly to lower the bottle lifter 16 to the same level as the platform 29. Likewise, the trailing edge of the cam 33 slopes upwardly so as to permit the bottle lifters 16 to move upwardly in the direction they are urged by the spring loading within the telescoped socket 17 and upstanding member 18 assembly.

As each bottle lifter 16 moves past the platform 29, a bottle 31 is transferred thereto and thus as the roller 19 leaves the cam 33, the bottle lifter 16 is raised by spring pressure to press the bottle 31 thereon against the corresponding filling valve 13 to open the valve 13 and fill the bottle 31.

The bottles 31 are transferred from the bottle lifters 16 to the platform 29 through the cooperation of a floating starwheel 34 and an arcuate guide 35 mounted on a support 35a supported on the platform 29 and spaced radially from said starwheel 34. One end of the arcuate guide 35 is interposed over the path of movement of the bottle lifters 16 so that as a bottle 31 is carried by a lifter 16 into engagement with the arcuate guide 35, the continued forward movement of the lifter 16 causes the bottle 31 to be removed therefrom. The starwheel 34 is provided with relatively radial arms 36—preferably three in number spaced equidistant apart—and each successive bottle 31 is adapted to be straddled by two of the arms 36 as it reaches the point where it is to be transferred to the platform 29. As the bottle lifter 16 advances carrying the bottle 31 thereon, the starwheel 34 moves at substantially the same rate, and as the forward movement of the bottle 31 is stopped by the arcuate guide 35, the radial arm 36 of the starwheel 34 trailing the bottle 31 continues to rotate and pushes the bottle 31 onto the platform 29 and into capping position.

A cam wheel 37 is journaled on the shaft 22 immediately beneath the starwheel 34, and is free to rotate on said shaft 22. The starwheel 34 is drilled at a predetermined radial distance from its axis to provide a hole 38 and the cam wheel 37 is similarly drilled the same radial distance from the axis to provide a plurality of circumferentially spaced holes 39. The starwheel 34 may then be turned to any relative position with respect to the cam wheel 37 where the respective holes 38 and 39 are in register and a pin 40 may then be inserted therethrough to insure that the starwheel 34 and the cam wheel 37 will turn together. As shown in Fig. 2, the pin 40 has a head 41 of greater diameter than the hole 38 so that it will not slip downwardly therebeyond. Also, the pin 40 may have a portion of reduced diameter as shown at 42 to permit shearing thereof when the starwheel 34, for example, encounters excessive resistance to its turning with the cam wheel 37.

The cam wheel 37 has a plurality of teeth 43, 44, and 45 around its periphery, there being three such teeth on the cam wheel 37 for each arm 36 on the starwheel 34. The said teeth are adapted to be engaged by the respective yokes 20 on the bottle lifters 16 as said lifters 16 pass through their circumferential path around the column 11. The leading edge of the yoke 20 is adapted to engage the rounded trailing edge of what might be called the "pusher" tooth 43, and, as the yoke 20 is advanced by rotation of the column 11, it pushes against the tooth 43 to produce corresponding rotation of the cam wheel 37. As the rotation continues, the yoke 20 straddles the tooth 44 and then the trailing edge of the yoke 20 bears against the humped trailing edge of the tooth 44, until the yoke 20 passes the hump at which time the yoke 20 becomes disengaged from the cam wheel 37 and the latter stops rotating until the next "pusher" tooth 43 is engaged by the next yoke 20.

The third tooth 45 on the cam wheel 37 is adapted to engage a locking device 46 as shown in Fig. 3 which is substantially L-shaped and pivotally mounted at one side on the housing 21 immediately under the cam wheel 37. Adjacent its pivotal mounting, the locking device 46 has a counterweight 47 which outweighs the leg 48 opposed thereto. The leg 48, which is interposed in the arcuate path of movement of the yoke 20 is provided with a downwardly sloped end 49 which, when contacted by a moving yoke 20, permits the yoke 20 to move smoothly over the top surface of the leg 48 and thereby to depress said leg 48. A locking peg 50 is provided on top of the leg 48 and this peg 50 normally projects into the path of movement of the teeth 43, 44, and 45 on the cam wheel 37 except when the leg 48 is depressed by engagement with a yoke 20. In usual operation, the peg 50 is positioned immediately ahead of the lock tooth 45 and the cam wheel 37 is locked thereby against forward rotation except when the movement of a bottle lifter 16 through its circumferential path brings its depending yoke 20 into engagement with the leg 48 thus disengaging the locking peg 50 so as to permit the yoke 20 to move the cam wheel 37 the predetermined distance to permit an arm 36 of the starwheel 34 to slide a bottle 31 off of the lifter 16 into capping position.

It will be understood that to insure proper contact between an arm 36 of the starwheel 34 and a bottle 31, and the proper placement of the bottle in capping position, it is necessary that the starwheel 34 be adjustable with respect to the cam wheel 37 for different sizes and shapes of bottles 31. Thus a plurality of holes 39 are drilled in the cam wheel 37 as heretofore explained and preferably these are marked with suitable symbols to designate which cam wheel hole 39 the pin 40 should be inserted into for proper handling of a certain bottle size. If desired a second hole 38a may be drilled in the starwheel 34—preferably a little greater or lesser radial distance from the axis than the first—and corresponding holes 39a may be drilled in the cam wheel 37 the same radial distance from the axis, so as to permit a greater number of positions for the starwheel 34 with respect to the cam wheel 37.

It will be noted that the base 10 is provided with a crank 51 and this is connected with the column 11 in such a manner that said column 11 may be raised or lowered with respect to the base 10 and the collar 15 on which the radial brackets 14 are mounted.

Thus, in preparing the filler herein disclosed for operation, the first step is to adjust the bowl 12 for proper height with respect to the bottle lifters 16 to handle the particular size bottles 31 to be filled. Then, by operation of the crank 26, the capping head 27 is raised or lowered to the proper height to cap the same size bottles 31. Next, the pin 40 is removed from the holes 38 and 39 and the starwheel 34 is then turned to the position with respect to the cam wheel 37 which will insure proper handling by the starwheel arms 36 of the size bottles 31 which are to be filled. The pin 40 is then inserted into the starwheel hole 38 or 38a and corresponding cam wheel hole 39 or 39a to maintain that positioning of the starwheel 34 with respect to the cam wheel 37. The filler is then ready for operation and as bottles 31 which have been fed to the bottle lifters 16 reach the capping station, they will be removed by starwheel arms 36 in cooperation with the arcuate guide 35 to the capping platform 29, and each successive bottle will push those preceding out of the way.

While we have shown and described our invention in a preferred form, it will be understood that various modifications and changes can be made in the general design or features thereof without departing from the spirit of our invention, the scope of which is to be determined by the appended claims.

We claim:

1. The combination with a receptacle filler having a receptacle collecting table and receptacle platform adapted to move through a predetermined path into proximity with and at substantially the same level as said table of receptacle transfer means comprising a guide superposed over said table and extending over the path of said platform, a pusher spaced from and swingable in substantially the same horizontal plane as said guide, a cam wheel mounted coaxially with said pusher and having a plurality of spaced teeth, a depending projection on said platform adapted to engage a tooth of said cam wheel as said platform comes into proximity with said table and to turn said cam wheel a partial revolution as said platform moves therebeyond, a connector removably engageable with said pusher and said cam wheel to communicate movement of the cam wheel to the pusher, and a lock for said cam wheel comprising a pivoted arm with a lug thereon held yieldably in engagement with said cam wheel, said arm having a portion disposed in the path of movement of said platform projection to be pressed thereby out of engagement with said cam wheel when said projection comes into engagement with said teeth.

2. In a device of the class described wherein a receptacle carrier is adapted to move through a predetermined path past a table, means for transferring an article from said carrier as it passes said table comprising a cam adjacent said table adapted to cooperate with cam engaging means on said carrier to hold said carrier in substantially the same horizontal plane as said table as the carrier moves therepast, a guide mounted over said table and extending therebeyond over the carrier path, a pusher arm spaced from said guide and pivotally mounted for lateral swinging movement, a cam wheel mounted coaxially with and below said pusher arm, said cam wheel having a plurality of spaced teeth and having a top face with indexing holes thereon, said pusher arm having a vertical hole therethrough adapted to align selectively with any one of said indexing holes, a key insertable through said vertical hole and an indexing hole to connect said pusher arm with said cam wheel in a predetermined relation, downwardly depending means on said carrier adapted to engage said cam wheel and to cause partial rotation thereof as said carrier moves past said table, and a yieldable cam wheel lock adapted normally to engage said cam wheel and to prevent rotation thereof and having an extension engageable by said downwardly depending means to displace said cam wheel lock to permit movement of said cam wheel.

References Cited in the file of this patent

UNITED STATES PATENTS

| | | |
|---|---|---|
| 1,112,155 | Muench | Sept. 29, 1914 |
| 1,454,931 | Konefes | May 15, 1923 |
| 2,356,271 | Reynolds | Aug. 22, 1944 |